United States Patent
Groppe et al.

(10) Patent No.: US 9,592,703 B1
(45) Date of Patent: Mar. 14, 2017

(54) HEIGHT ADJUSTABLE SUPPORT FOR FOOD PROCESSING EQUIPMENT

(71) Applicants: Rudi Groppe, Gilroy, CA (US); Erick Arthur Davidson, Salinas, CA (US)

(72) Inventors: Rudi Groppe, Gilroy, CA (US); Erick Arthur Davidson, Salinas, CA (US)

(73) Assignee: Heinzen LLC, Gilroy, CA (US)

( * ) Notice: Subject to any disclaimer, the term of this patent is extended or adjusted under 35 U.S.C. 154(b) by 0 days.

(21) Appl. No.: 14/881,597

(22) Filed: Oct. 13, 2015

Related U.S. Application Data

(60) Provisional application No. 62/218,473, filed on Sep. 14, 2015.

(51) Int. Cl.
  *B60B 33/04* (2006.01)
  *A47B 91/02* (2006.01)
  *B60B 33/00* (2006.01)

(52) U.S. Cl.
  CPC .............. *B60B 33/04* (2013.01); *A47B 91/02* (2013.01); *B60B 33/006* (2013.01); *B60B 33/0078* (2013.01); *Y10T 16/193* (2015.01)

(58) Field of Classification Search
  CPC ..... A47B 91/02; A47B 91/022; A47B 91/024; A47B 91/026; A47B 91/028; A61G 1/0268; A45C 5/146; B60B 33/04; B60B 33/06; B60B 33/063; Y10T 16/182; Y10T 16/193; Y10T 16/1937; Y10T 16/21
  See application file for complete search history.

(56) References Cited

U.S. PATENT DOCUMENTS

| 190,716 | A | * | 5/1877 | Hauersperger | F24C 15/086 126/304 A |
| 894,949 | A | * | 8/1908 | Hendricks | B60B 33/06 16/32 |
| 952,694 | A | * | 3/1910 | Ward | B60B 33/06 16/18 CG |
| 1,032,006 | A | * | 7/1912 | Hyde | B60B 33/06 16/32 |
| 1,155,606 | A | * | 10/1915 | Neller | B60B 33/06 16/33 |
| 1,155,607 | A | * | 10/1915 | Neller | B60B 33/06 16/30 |
| 1,636,325 | A | * | 7/1927 | Roe | B60B 33/06 16/33 |
| 1,897,187 | A | * | 2/1933 | Bulman | A47B 91/02 108/1 |
| 1,999,016 | A | * | 4/1935 | Deal | A47B 91/02 248/188.3 |

(Continued)

*Primary Examiner* — Jeffrey O Brien
(74) *Attorney, Agent, or Firm* — GSS Law Group

(57) ABSTRACT

A height adjustable support comprising a three-sided support channel, a cylindrical support post positioned within the support channel and at least one saddle brace positioned within the support channel and to partially surround the cylindrical support post. In the present invention, the downward force resulting from the weight of the equipment results in static friction between the saddle brace and the cylindrical support post that is sufficient to hold the equipment surface at a desired height. The height adjustable support may be implemented into hygienically designed food processing equipment to eliminate undesirable bacteria harboring surfaces and to improve height adjustability of the equipment.

10 Claims, 8 Drawing Sheets

(56) References Cited

U.S. PATENT DOCUMENTS

| | | | | |
|---|---|---|---|---|
| 2,107,629 A * | 2/1938 | Dallas | A47B 91/02 16/19 |
| 2,110,005 A * | 3/1938 | Rees | F24C 15/08 16/19 |
| 2,213,471 A * | 9/1940 | Minnick | E06C 7/44 182/201 |
| 2,613,957 A * | 10/1952 | Ritter | F16B 12/40 108/158.11 |
| 2,950,498 A * | 8/1960 | Rizzuto | B60B 33/0042 16/33 |
| 3,041,083 A * | 6/1962 | Blanc | B60B 33/06 280/43.21 |
| 3,237,940 A * | 3/1966 | Johnson | A61H 3/04 16/35 R |
| 5,060,896 A * | 10/1991 | Hobbins | A47B 91/02 248/188.2 |
| 5,457,849 A * | 10/1995 | Branson | B60B 33/04 16/19 |
| 5,558,027 A * | 9/1996 | Williams | B60B 33/06 109/45 |
| 5,588,624 A * | 12/1996 | Woodham | A47B 91/028 248/188.4 |
| 5,716,186 A * | 2/1998 | Jensen | A47F 5/108 187/244 |
| 6,361,252 B1 * | 3/2002 | Leitheiser | E02B 3/068 16/33 |
| 6,899,345 B1 * | 5/2005 | Bearden | A01D 34/74 16/19 |
| 7,159,829 B1 * | 1/2007 | Finkelstein | B60B 33/04 108/144.11 |
| 8,029,413 B2 * | 10/2011 | Law | A63B 71/023 482/27 |
| 8,967,401 B2 * | 3/2015 | Wu | A47B 47/0083 211/191 |
| 9,273,817 B2 * | 3/2016 | Khanampornpan | A47B 3/0815 |

* cited by examiner

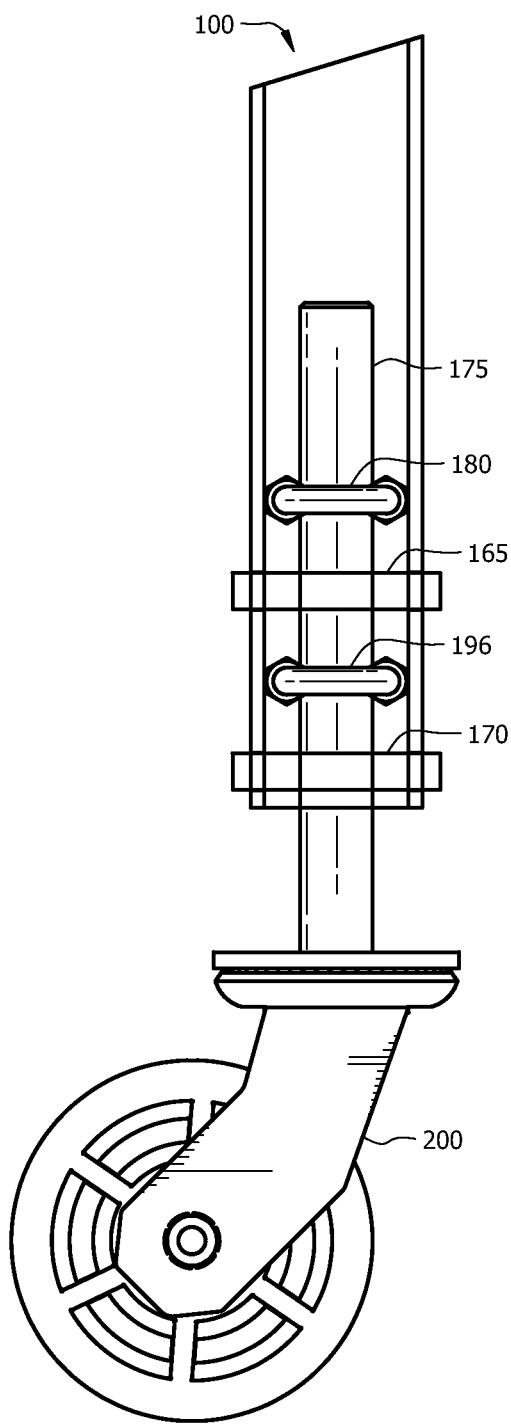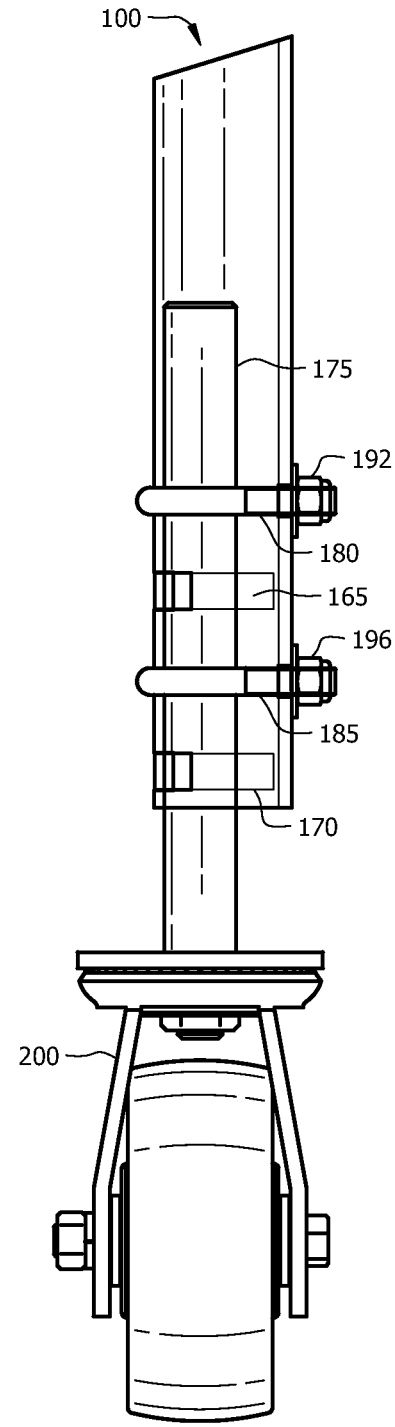
FIG. 2A
FIG. 2B

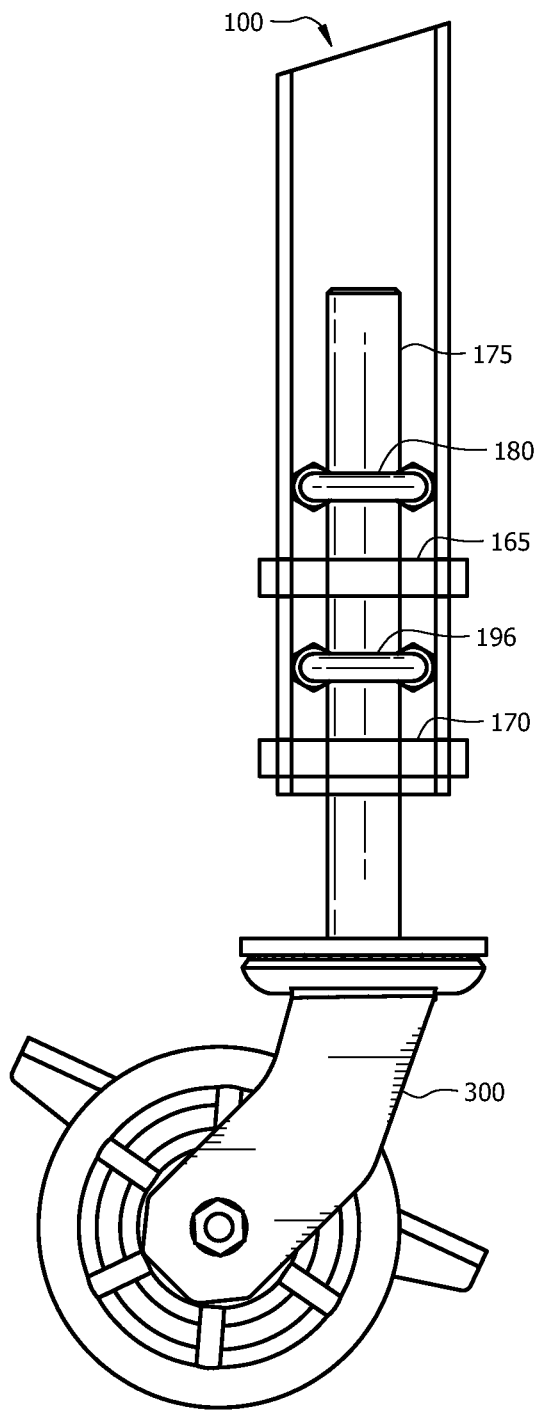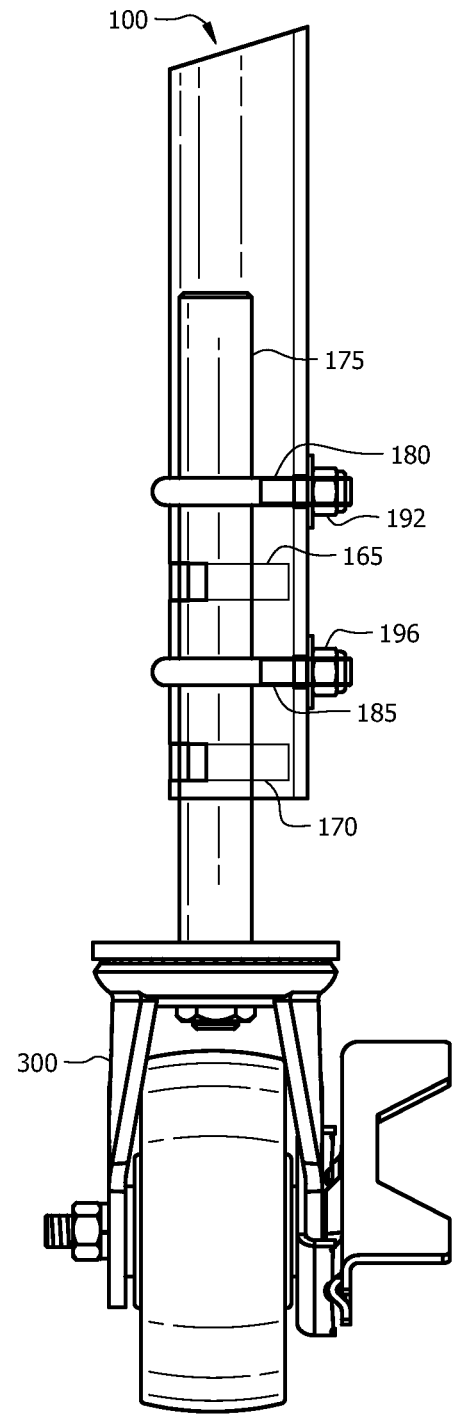
*FIG. 3A*  *FIG. 3B*

HEIGHT ADJUSTABLE SUPPORT FOR FOOD PROCESSING EQUIPMENT

FIELD OF THE INVENTION

The present invention relates generally to a height adjustable support, and more particularly to a height adjustable support designed for use in food processing equipment that minimizes the possibility of food contamination.

BACKGROUND OF THE INVENTION

The Food Safety Modernization Act (FSMA) of 2011 aims to ensure that the United States food supply is safe by shifting the focus from simply responding to food contamination to proactively preventing the contamination of food. As such, there is a need in the art for hygienically designed food processing equipment that produces microbiologically safe food by minimizing the risk of contamination. It is also desirable that the hygienically designed food processing equipment be easily cleaned and sanitized to further reduce the risk of contamination.

Standing water in a food processing facility has been identified as one potential cause of food contamination. Standing water provides a breeding ground for bacteria, such as listeria, which multiplies in wet conditions that lack sanitary measures. In addition, washing and sorting equipment that is not designed to allow for adequate cleaning and sanitizing can provide an additional breading ground for bacteria.

Commercial food processing and food service equipment is often supported upon a floor by support legs having a footpad or a moveable caster. Typically the support legs or casters are adjustable to allow for height adjustments to achieve a desired height in a working environment. Adjusting the height of the equipment may also be necessary to provide a level work surface in situations where the floor itself is not level or even. Typically, adjustable legs are designed having a threaded shaft and a complimentary threaded footpad or caster that is adjustable by screwing the footpad or caster in or out of the threaded shaft to achieve the desired equipment height. However, the threaded shaft design provides a harborage for bacteria as a result of the increased surface area of the threads. Additionally, the threaded shaft is commonly implemented in an unsealed square or rectangular tubular leg, which allows water to intrude into the unsealed leg and provides a breeding ground for bacteria. Because the threaded shaft is enclosed within the square tube leg, the interior of the leg is inaccessible making it very difficult to sanitize, thereby increasing the overall operating cost of the equipment.

Additionally, the prior art adjustable support having a threaded shaft is difficult to adjust because it is necessary to lift the equipment off of the ground by an amount sufficient to allow for the adjustment of the caster within the threaded shaft to raise or lower the height of the equipment.

According, what is needed in the art is an improved height adjustable support for use in hygienically designed food processing equipment that eliminates undesirable bacteria harboring surfaces and that is easy to sanitize and easy to adjust.

SUMMARY

The invention includes a height adjustable support comprising a three-sided support channel, a cylindrical support post positioned within the support channel and at least one saddle brace positioned within the support channel and to partially surround the cylindrical support post. In the present invention, the downward force resulting from the weight of the equipment results in static friction between the saddle brace and the cylindrical support post that is sufficient to hold the equipment surface at a desired height. The open design afforded by the three-sided support channel allows the interior of the height adjustable support to be easily sanitized. Additionally, the elimination of the threads from the design reduces the chances of bacteria growth. The height adjustable support is easily adjusted by raising the equipment to a desired height and then releasing the weight of the equipment to reengage the saddle brace with the cylindrical support.

In various embodiments, the support channel of the height adjustable support includes a back wall, a first side wall and a second side wall, the first side wall having at least one securing notch positioned along a first lengthwise edge of the first side wall and the second side wall having at least one securing notch positioned along a first lengthwise edge of the second side wall and aligned with the at least one securing notch of the first side wall. The height adjustable support further includes at least one saddle brace, the at least one saddle brace includes a semicircular portion dimensioned to be positioned within the interior of the support channel and to partially surround and be in contact with a cylindrical support post positioned within the interior of the support channel. The saddle brace further includes a first notched flange extending from a first end of the semicircular portion of the saddle brace and a second notched flange extending from a second end of the semicircular portion of the saddle brace. The first notched flange is dimensioned to engage with the at least one securing notch of the first side wall of the support channel and the second notched flange is dimensioned to engage with the at least one securing notch of the second side wall of the support channel.

The height adjustable support may further include at least one u-shaped bolt dimensioned to partially surround the cylindrical support post and the legs of the u-shaped bolt to engage with a pair of aligned voids formed in the back wall of the support channel.

The height adjustable may further include a footpad or a caster secured to one end of the cylindrical support post.

In one embodiment of the present invention, a load-carrying structure, such as food processing equipment, may include at least one height adjustable support comprising a support channel which includes a back wall, a first side wall and a second side wall, the first side wall having at least one securing notch positioned along a first lengthwise edge of the first side wall and the second side wall having at least one securing notch positioned along a first lengthwise edge of the second side wall and aligned with the at least one securing notch of the first side wall. The height adjustable support may further include at least one saddle brace, the at least one saddle brace includes a semicircular portion dimensioned to be positioned within the interior of the support channel and to partially surround and be in contact with a cylindrical support post positioned within the interior of the support channel. The saddle brace may further include a first notched flange extending from a first end of the semicircular portion of the saddle brace and a second notched flange extending from a second end of the semicircular portion of the saddle brace. The first notched flange is dimensioned to engage with the at least one securing notch of the first side wall of the support channel and the second notched flange is dimensioned to engage with the at least one securing notch of the second side wall of the support channel.

Accordingly, the present invention provides an improved height adjustable support for use in hygienically designed food processing equipment that eliminates undesirable bacteria harboring surfaces and that is easy to sanitize and easy to adjust.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 2A is a diagrammatic front view of a height adjustable support having a swivel caster in accordance with an embodiment of the present invention.

FIG. 2B is a diagrammatic side view of a height adjustable support having a swivel caster in accordance with an embodiment of the present invention.

FIG. 3A is a diagrammatic front view of a height adjustable support having a swivel caster in accordance with an embodiment of the present invention.

FIG. 3B is a diagrammatic side view of a height adjustable support having a swivel caster in accordance with an embodiment of the present invention.

DETAILED DESCRIPTION

The present invention provides a height adjustable support comprising a three-sided support channel, a cylindrical support post positioned within the support channel and at least one saddle brace positioned within the support channel and to partially surround the cylindrical support post that can be incorporated into hygienically designed food processing equipment to eliminate surface that are prone to harboring bacteria. Additionally, the height adjustable support of the present invention is easy to adjust allowing for improved leveling and height adjustment of food processing equipment.

Figure 1A:
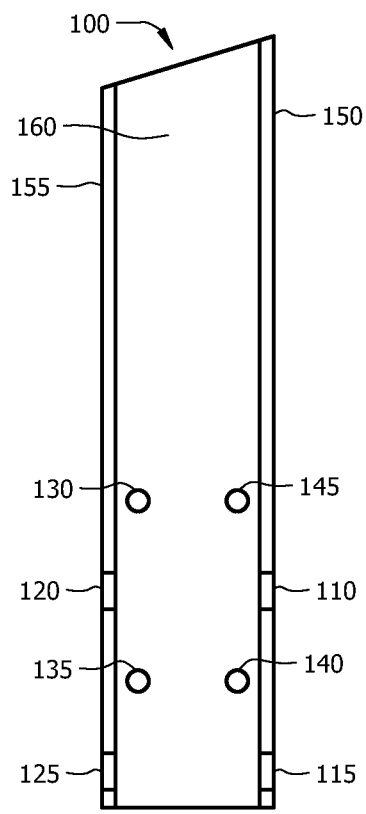
FIG. 1A is a diagrammatic front view of a support channel of a height adjustable support in accordance with an embodiment of the present invention.

With reference to FIG. 1A, a height adjustable support of the present invention comprises, a support channel 100 which includes a back wall 160, a first side wall and 150 a second side wall 155, the first side wall 150 having at least one securing notch 110, 115 positioned along a first lengthwise edge of the first side wall 150 and the second side wall 155 having at least one securing notch 120, 125 positioned along a first lengthwise edge of the second side wall 155 and aligned with the at least one securing notch 110, 115 of the first side wall 150. In the embodiment of FIG. 1A, the support channel 100 includes two notches 110, 115 in the first side wall 150 which are aligned with two notches 120, 125 in the second side wall 155. This configuration is not intended to be limiting and additional side wall notches are within the scope of the present invention.

With reference to FIG. 2, the height adjustable support of the present invention further includes, at least one saddle brace 165, 170. As shown in more detail with reference to FIG. 1F, the at least one saddle brace 165 includes a semicircular portion 142 dimensioned to be positioned within the interior of the support channel 100 and to partially surround and be in contact with a cylindrical support post 175 positioned within the interior of the support channel 100. The saddle brace 165 further includes a first notched flange 148 extending from a first end of the semicircular portion 142 of the saddle brace 165 and dimensioned to engage with the at least one securing notch 110 of the first side wall 150 of the support channel 100 and a second notched flange 144 extending from a second end of the semicircular portion 142 of the saddle brace 165 and dimensioned to engage with the at least one securing notch 120 of the second side wall 155 of the support channel 100. As shown, the first notched flange 148 comprises a notch 152 that is complementary to the securing notch 110 of the first side wall 150 of the support channel 100 and the second notched flange 144 comprises a notch 146 that is complementary to the securing notch 120 of the second side wall 155 of the support channel 100.

Figure 1B:
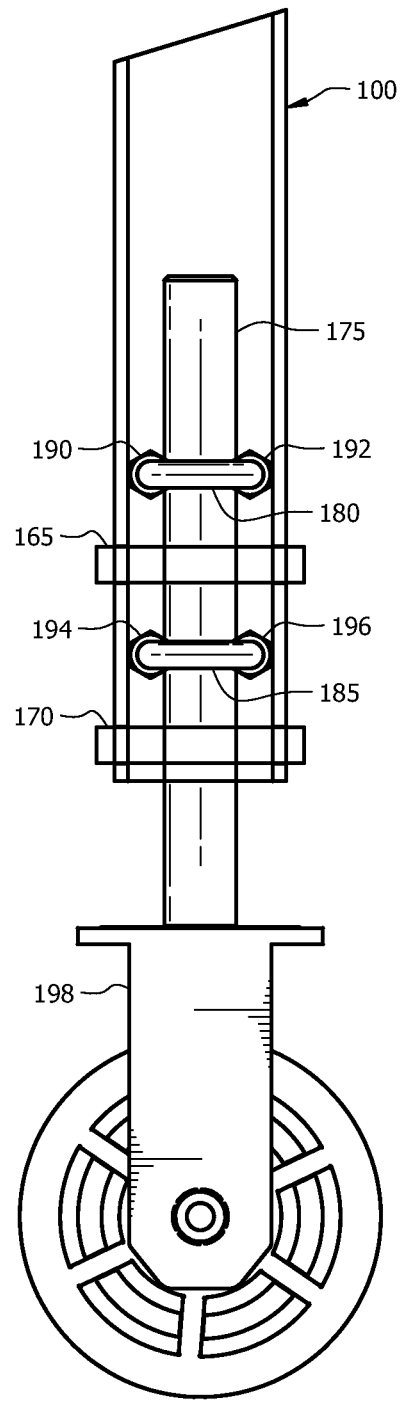
FIG. 1B is a diagrammatic front view of a height adjustable support having a caster in accordance with an embodiment of the present invention.

FIG. 1B illustrates a front view of the height adjustable support of the present invention. As shown, the support channel 100 is a three-sided open channel that can be easily sanitized. In this embodiment, a cylindrical support post 175 having a caster 198 is positioned within the support channel 100. A first saddle brace 165 is positioned within the support channel 100 to partially surround the cylindrical support post 175 and to engage with the corresponding notches 110 and 120 of the support channel 100. A second saddle brace 170 is positioned within the support channel 100 to partially surround the cylindrical support post 175 and to engage with the corresponding notches 115 and 125 of the support channel 100. The first saddle brace 165 and the second saddle brace 170 are in contact with the cylindrical post 175 and the saddle braces 165, 170 are held in a fixed location along the length of the support channel 100 established by the corresponding notches 110, 115, 120, 125.

In the present invention, the support channel 100 may be secured to food processing equipment wherein the weight of the equipment establishes friction at the contact point between the saddle braces 165, 170 and the cylindrical post 175. Since the location of the saddle braces 165, 170 are fixed along the length of the support channel 100, the friction between the saddle braces 165, 170 and the cylindrical support post 175 is sufficient to hold the equipment at a desired elevation from a supporting floor. Additionally, to adjust the height of the equipment, the extension of the cylindrical support 175 within the support channel 100 can be changed. In order to change the extension of the cylindrical support 175 within the support channel 100 the equipment can be jacked-up to take the weight off of the support channel 100, thereby removing the friction between the saddle braces 165, 170 and the cylindrical support post 175. When the equipment is at the desired height, the weight of the equipment can then be placed back onto the support channel 100, thereby reestablishing the friction between the saddle braces 165, 170 and the cylindrical support post 175, the friction being sufficient to hold the cylindrical support post 175 at the desired position within the support channel 100. In a particular embodiment, the saddle braces 165, 170 may be welded to the support channel 100 to provide additional support.

To provide additional support for the cylindrical support post 175 within the support channel 100, the height adjustable support of the present invention may further include one or more u-shaped bolts positioned to surround the cylindrical support post and to engage with the back side 160 of the support channel 100. As shown with reference to FIG. 1A, the back side 160 of the support channel 100 may further include a least one pair of aligned voids 130, 145. In this particular embodiment, a first pair of aligned voids 130, 145 and a second pair of aligned voids 135, 140 are illustrated, however this is not intended to be limiting and additional pairs of aligned voids are within the scope of the present invention. The voids are dimensioned to receive the legs of a u-shaped bolt that partially surround the cylindrical support post 175 positioned within the support channel 100.

With reference again to FIG. 1B, a first u-shaped bolt 180 is positioned to surround the front side of the cylindrical support post 175 and the legs of the u-shaped bolt 180 are positioned within the pair of aligned voids 130, 145 in the back side 160 of the support channel 100. A second u-shaped bolt 185 is positioned to surround the front side of the cylindrical support post 175 and the legs of the u-shaped bolt 185 are positioned within the pair of aligned voids 135, 140 in the back side 160 of the support channel 100. The first u-shaped bolt 180 may be secured to the support channel 100 using an attachment member 190, 192 to secure the legs of the u-shaped bolt 180 after the legs have been inserted into the voids 130, 145 of the support channel 100. Additionally, the second u-shaped bolt 185 may be secured to the support channel 100 using an attachment member 194, 196 to secure the legs of the u-shaped bolt 185 after the legs have been inserted into the voids 135, 140 of the support channel 100.

Figure 1C:
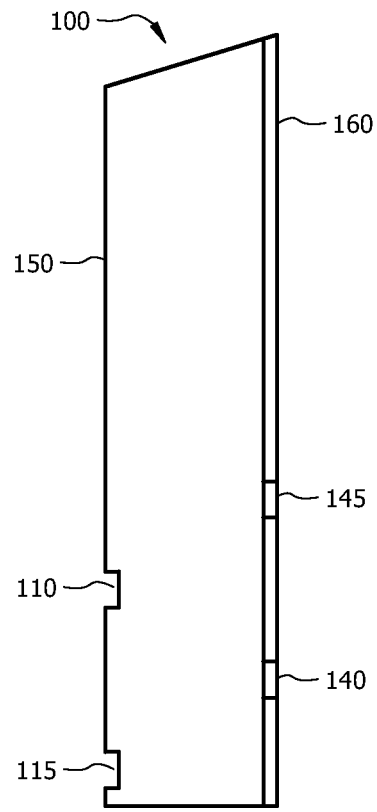
FIG. 1C is a diagrammatic side view of a support channel of a height adjustable support in accordance with an embodiment of the present invention.
Figure 1D:
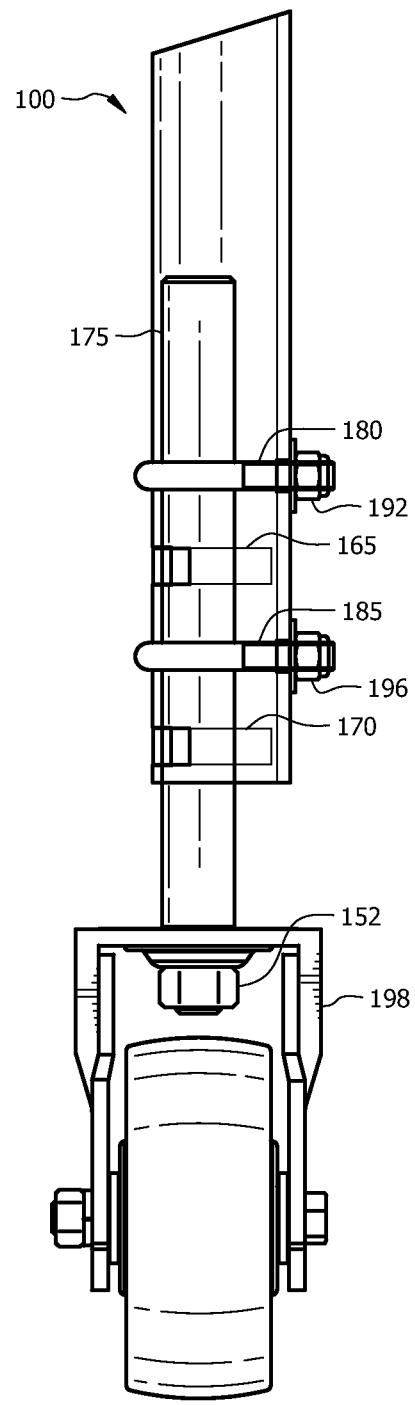
FIG. 1D is a diagrammatic side view of a height adjustable support having a caster in accordance with an embodiment of the present invention.
Figure 1E:
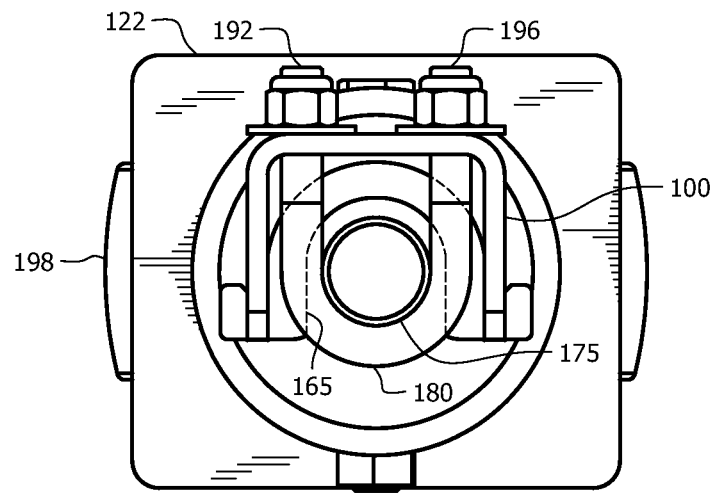
FIG. 1E is a diagrammatic top-down view of a height adjustable support having a caster in accordance with an embodiment of the present invention.
Figure 1F:
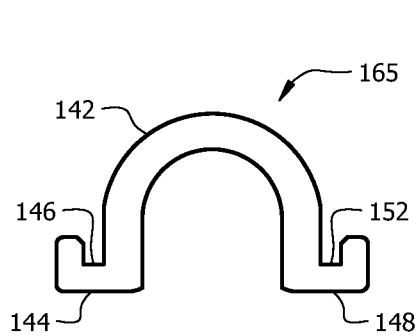
FIG. 1F is a diagrammatic view of a saddle brace in accordance with an embodiment of the present invention.
Figure 1G:
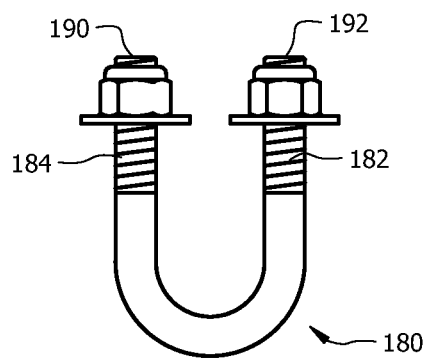
FIG. 1G is a diagrammatic view of a u-shaped bolt and attachment members in accordance with an embodiment of the present invention.

A more detailed view of the u-shaped bolt is shown with reference to FIG. 1G. As illustrated, the u-shaped bolt 180 may include threaded legs 182 and 184 and the attachment member 190, 192 used to secure the u-shaped bolt 185 to the support channel 100 may be a complimentary threaded nut.

FIG. 1C shows a side view of the support channel 100 illustrating the voids 140, 145 of the back wall 160 of the support channel 100 and notches 110, 115 of the first side wall 150 of the support channel 100. FIG. 1D shows a side view of the height adjustable support of the present invention comprising a caster 198 that is secured by a fastener 152 to the cylindrical support post 175. In this embodiment, the height of equipment attached to the support channel 100 is determined by the extension of cylindrical support post 175 into the support channel 100 which is controlled by the saddle braces 165 and 170 positioned to surround a back side of the cylindrical support post 175. Additional lateral support is provided by the u-shaped bolts 180, 185 positioned to surround the front side of the cylindrical support post and to be secured to the back side of the support channel 100 by the attachment members 192, 196.

FIG. 1E illustrates a top-down view of the height adjustable support of the present invention. As shown in FIG. 1E, the cylindrical support post 175 is positioned within the interior of the support channel 100. The saddle brace 165 is positioned to surround the back side of the cylindrical support post 175 and to engage with notches of the support channel 100 as previously described. The u-shaped bolt 180 is positioned to surround the front side of the cylindrical support post 175 and to engage with the voids positioned in the back side of the support channel 100 and to be secured to the support channel 100 by attachment members 192, 195.

Figure 2C:
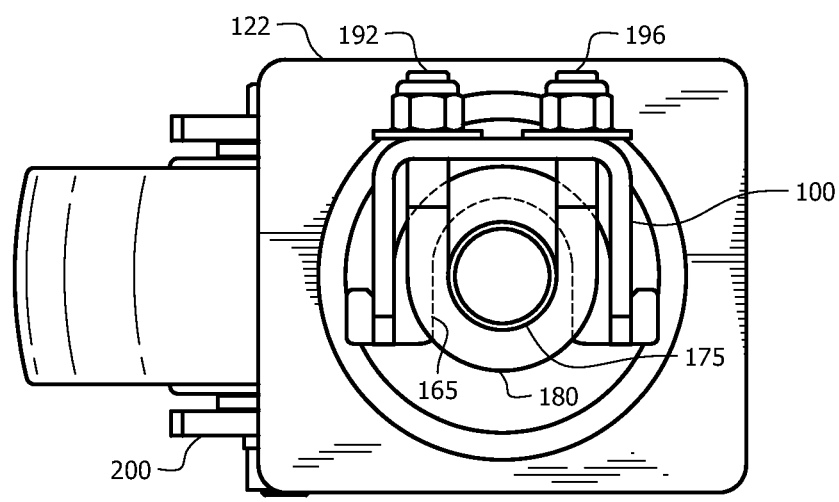
FIG. 2C is a diagrammatic top-down view of a height adjustable support having a swivel caster in accordance with an embodiment of the present invention.

As shown with reference to FIG. 2A and FIG. 2B the cylindrical support post 175 may further comprise an angled caster 200. As previously described, the cylindrical support post 175 and angled caster 200 may be adjustable secured within the support channel 100 using saddle braces 165, 170 and u-shaped bolts 180, 196. FIG. 2A illustrates a front view of the height adjustable support showing the open three-sided channel design and FIG. 2B illustrates a side view of the height adjustable support showing the attachment members 192, 196 used to secure the u-shaped bolts 180, 196 to the support channel 100. FIG. 2C illustrates a top-down view of the height adjustable support of FIG. 2A and FIG. 2B. As shown in FIG. 2C, the cylindrical support post 175 is positioned within the interior of the support channel 100. The saddle brace 165 is positioned to surround the back side of the cylindrical support post 175 and to engage with notches of the support channel 100 as previously described. The u-shaped bolt 180 is positioned to surround the front side of the cylindrical support post 175 and to engage with the voids positioned in the back side of the support channel 100 and to be secured to the support channel 100 by attachment members 192, 195.

Figure 3C:
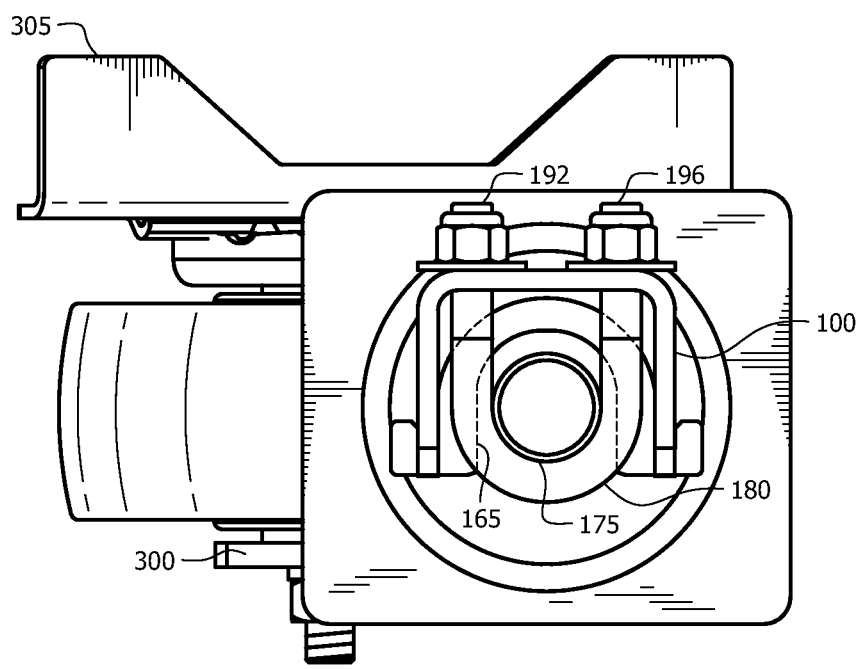
FIG. 3C is a diagrammatic top-down view of a height adjustable support having a swivel caster in accordance with an embodiment of the present invention.

As shown with reference to FIG. 3A and FIG. 3B the cylindrical support post 175 may further comprise an angled caster having a brake 300. As previously described, the cylindrical support post 175 and braked caster 300 may be adjustable secured within the support channel 100 using saddle braces 165, 170 and u-shaped bolts 180, 196. FIG. 3A illustrates a front view of the height adjustable support showing the open three-sided channel design and FIG. 3B illustrates a side view of the height adjustable support showing the attachment members 192, 196 used to secure the u-shaped bolts 180, 196 to the support channel 100. FIG. 3C illustrates a top-down view of the height adjustable support of FIG. 3A and FIG. 3B. As shown in FIG. 3C, the cylindrical support post 175 is positioned within the interior of the support channel 100. The saddle brace 165 is positioned to surround the back side of the cylindrical support post 175 and to engage with notches of the support channel 100 as previously described. The u-shaped bolt 180 is positioned to surround the front side of the cylindrical support post 175 and to engage with the voids positioned in the back side of the support channel 100 and to be secured to the support channel 100 by attachment members 192, 195.

Figure 4A:
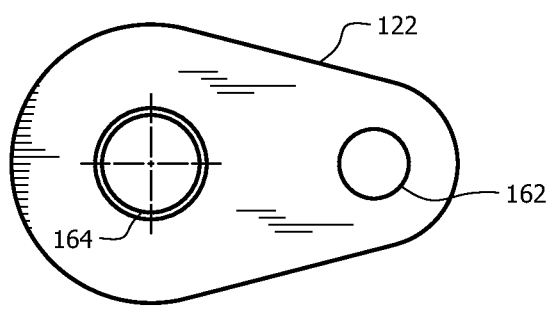
FIG. 4A is a diagrammatic top-down view of a footpad for a height adjustable support in accordance with an embodiment of the present invention.
Figure 4B:
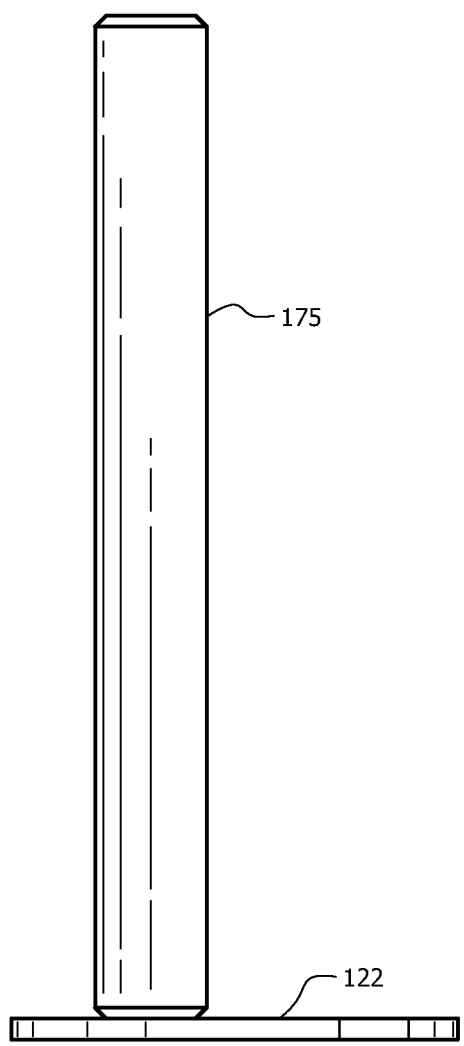
FIG. 4B is a diagrammatic side view of a height adjustable support having a footpad in accordance with an embodiment of the present invention.
Figure 4C:
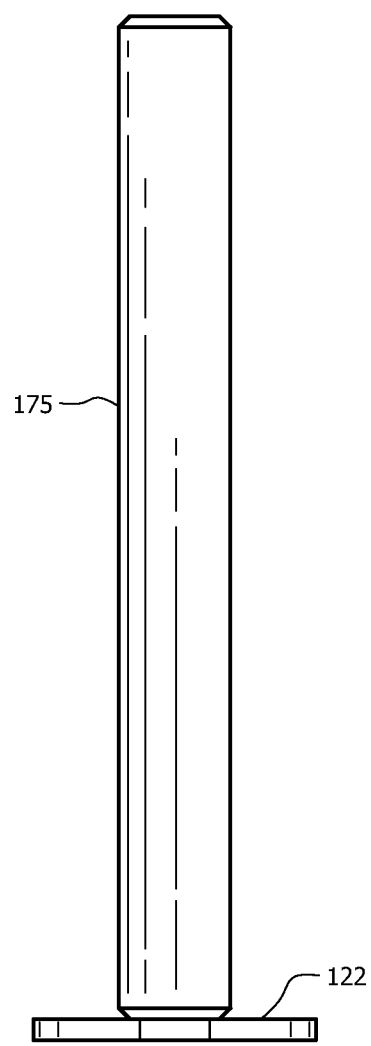
FIG. 4C is a diagrammatic front view of a height adjustable support having a footpad in accordance with an embodiment of the present invention.

As shown with reference to FIGS. 4A, 4B and 4C, the caster may be eliminated and the height adjustable support may be secured directly to a support floor using a footpad 122. FIG. 4A is a top-down view of a footpad 122 for the height adjustable support. FIG. 4B is a side view of a footpad 122 for the height adjustable support having a cylindrical support post 175. FIG. 4C is a front view of a footpad 122 for the height adjustable support having a cylindrical support post 175. As shown in this embodiment, a footpad may be secured to the cylindrical support post 175 through an aperture 164 in the footpad. In one embodiment, the footpad 122 may be secured to a support floor by an attachment member positioned through aperture 162 in the footpad 122. In this embodiment, the height adjustable support may be secured directly to the floor in a facility using the footpad 122 to provide a stationary equipment solution.

The support channel 100 and cylindrical support post 175 of the height adjustable support may be fabricated of stainless steel, through means commonly known in the art. In a particular embodiment, the cylindrical support post 175 may have a load rating of approximately 900 lbs. The u-shaped bolts 180, 196 may be rated at 1090 lbs. each and multiple u-shaped bolts may be implemented into the design of the height adjustable support to meet a desired load requirement.

As such, the present invention provides a height adjustable support that can be incorporated into hygienically designed food processing equipment to eliminate undesirable threaded surfaces, which are prone to harboring standing water and bacteria. Additionally, the open channel design of the height adjustable support of the present invention is easily sanitized and can be easily dissembled and reassembled for sanitation purposes. The height adjustable support also provides ease in adjustability of the height of the processing equipment through the use of a friction-based support system in contrast with the threaded caster design commonly employed in the art.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. A height adjustable support comprising:
a support channel comprising a back wall, a first side wall and a second side wall, the back wall having at least one pair of aligned voids, the first side wall having at least one securing notch positioned along a first lengthwise edge of the first side wall and the second side wall having at least one securing notch positioned along a first lengthwise edge of the second side wall and aligned with the at least one securing notch of the first side wall;
a cylindrical support post positioned within the interior of the support channel;
at least one saddle brace, the at least one saddle brace comprising a semicircular portion dimensioned to be positioned within the interior of the support channel and to partially surround and be in contact with the cylindrical support post, the saddle brace further comprising a first notched flange extending from a first end of the semicircular portion of the saddle brace and dimensioned to engage with the at least one securing notch of the first side wall of the support channel and a second notched flange extending from a second end of the semicircular portion of the saddle brace and dimensioned to engage with the at least one securing notch of the second side wall of the support channel; and
at least one u-shaped bolt having two legs, the u-shaped bolt positioned within the support channel to partially surround the support post and each of the legs positioned in one of each of the voids of the back wall of the support channel.

2. The height adjustable support of claim 1, further comprising at least one attachment member for securing the u-shaped bolt to the support channel.

3. The height adjustable support of claim 2, wherein the legs of the u-shaped bolt are threaded and the at least one attachment member is a threaded nut.

4. The height adjustable support of claim 1, wherein the cylindrical support post further comprises a footpad secured to one end of the cylindrical support post.

5. The height adjustable support of claim 1, wherein the cylindrical support further comprises a caster secured to one end of the cylindrical support post.

6. The height adjustable support of claim 1, wherein the caster is a swivel caster.

7. The height adjustable support of claim 6, wherein the caster further comprises a caster brake.

8. A load-carrying structure comprising:
at least one height adjustable support comprising;
a support channel comprising a back wall, a first side wall and a second side wall, the back wall having at least one pair of aligned voids, the first side wall having at least one securing notch positioned along a first lengthwise edge of the first side wall and the second side wall having at least one securing notch positioned along a first lengthwise edge of the second side wall and aligned with the at least one securing notch of the first side wall;
a cylindrical support post positioned within the interior of the support channel;
at least one saddle brace, the at least one saddle brace comprising a semicircular portion dimensioned to be positioned within the interior of the support channel and to partially surround and be in contact with the cylindrical support post, the saddle brace further comprising a first notched flange extending from a first end of the semicircular portion of the saddle brace and dimensioned to engage with the at least one securing notch of the first side wall of the support channel and a second notched flange extending from a second end of the semicircular portion of the saddle brace and dimensioned to engage with the at least one securing notch of the second side wall of the support channel; and
at least one u-shaped bolt having two legs, the u-shaped bolt positioned within the support channel to partially surround the support post and each of the legs positioned in one of each of the voids of the back wall of the support channel.

9. The load-carrying structure of claim 8, wherein the cylindrical support post further comprises a footpad secured to one end of the cylindrical support post.

10. The load-carrying structure of claim 8, wherein the cylindrical support post further comprises a caster secured to one end of the cylindrical support post.

* * * * *